July 21, 1953 L. S. HAMER 2,646,247
SEALING CONSTRUCTION FOR PLUG VALVES
Filed Feb. 28, 1947 2 Sheets-Sheet 1
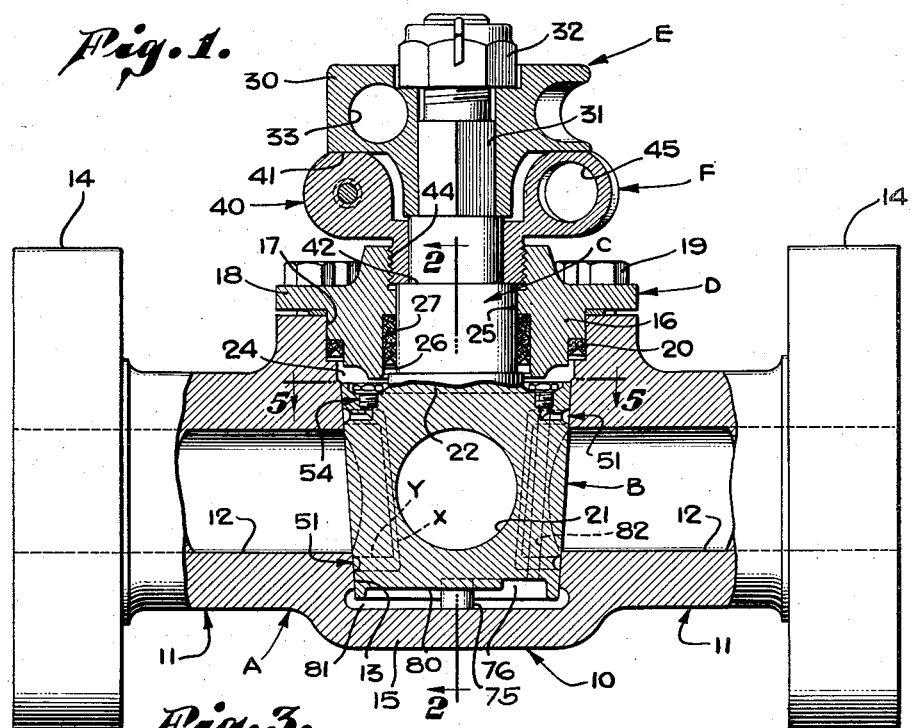
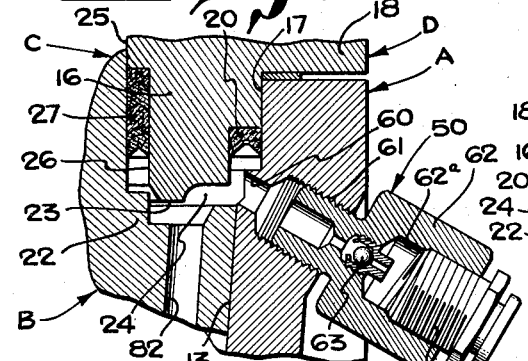
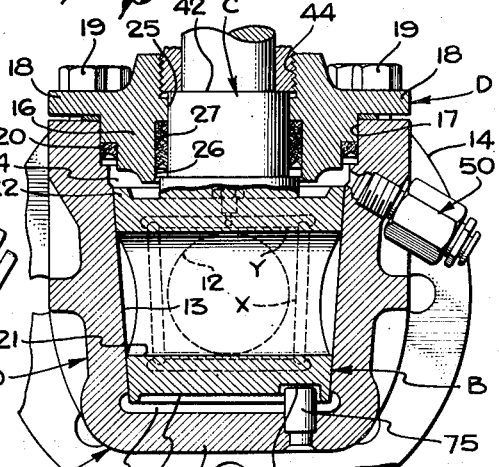
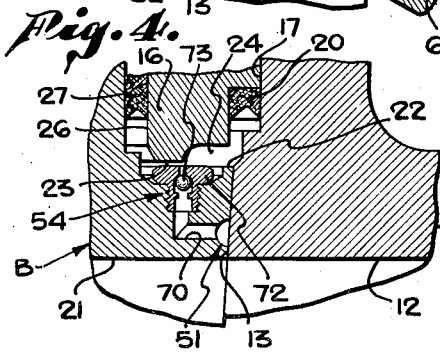
INVENTOR
Leland S. Hamer
BY
ATTORNEY July 21, 1953          L. S. HAMER          2,646,247

SEALING CONSTRUCTION FOR PLUG VALVES

Filed Feb. 28, 1947          2 Sheets-Sheet 2

INVENTOR
Leland S. Hamer
BY
ATTORNEY

Patented July 21, 1953

2,646,247

UNITED STATES PATENT OFFICE 2,646,247

SEALING CONSTRUCTION FOR PLUG VALVES

Leland S. Hamer, Long Beach, Calif., assignor of one-fourth to Paul A. Dewhirst, Los Angeles, Calif.

Application February 28, 1947, Serial No. 731,522

2 Claims. (Cl. 251—93)

This invention has to do with sealing construction for plug valves it being a general object of the invention to provide a simplified, improved, effective construction whereby a plug valve is sealed to effectively handle high pressures.

There are various situations where valves of the plug type are desirable and it has been found advantageous to seal such devices with grease or the like to prevent or to minimize leakage. Arrangements heretofore provided for sealing plug valves with grease or the like have presented certain difficulties and disadvantages and the results obtained have not been altogether satisfactory.

It is a general object of my present invention to provide a plug valve wherein bodies of sealing material are provided around the points where the flow passage in the body intersects the plug, which bodies of sealing material are separated. In the preferred form of my invention I provide check valves that separate the bodies of sealing material.

Another object of the present invention is to provide a structure of the general character referred to wherein there is a single pressure chamber carrying a supply of sealing material which is fed through the check valves to the points to be sealed. In accordance with my preferred construction the pressure chamber occurs between one end of the plug and the cap which retains the plug in place in the body.

It is a further object of my invention to provide a plug valve construction of the general character referred to including a single feed means whereby sealing material is fed to a pressure chamber from which it passes to individual sealing areas which are separated by valves.

Figure 5:
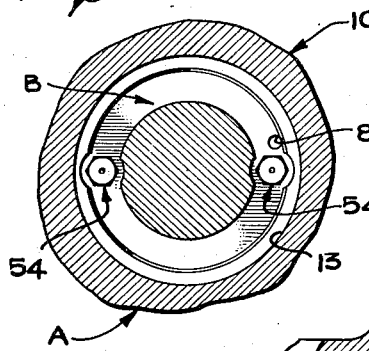
Figure 6:
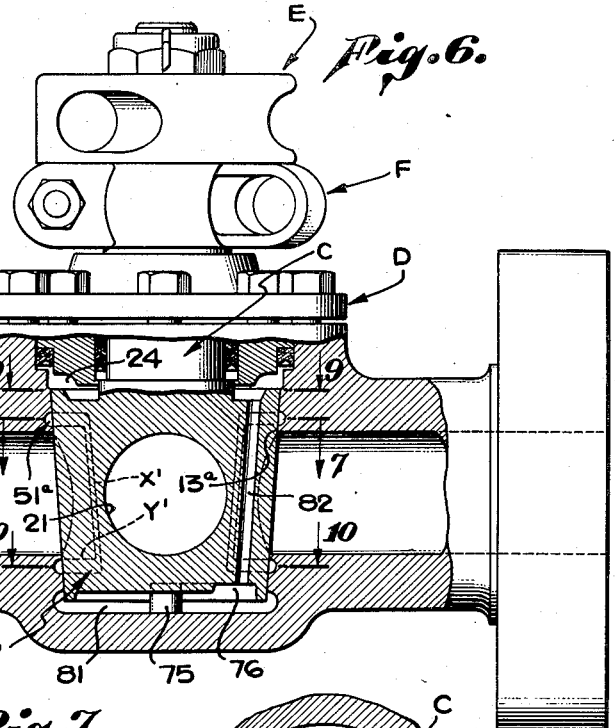
Figure 7:
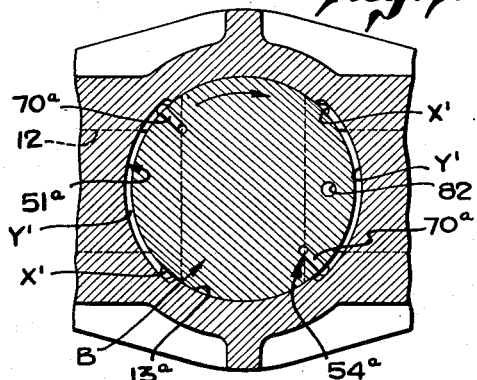
Figure 9:
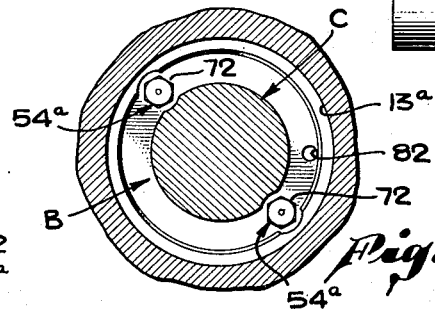
Figure 8:
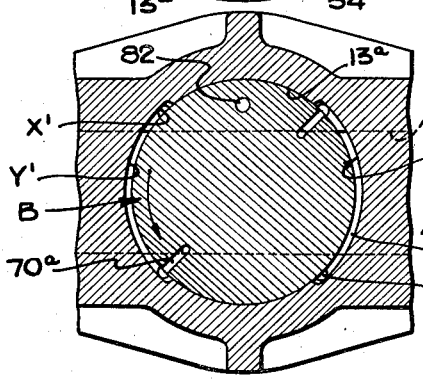
Figure 10:
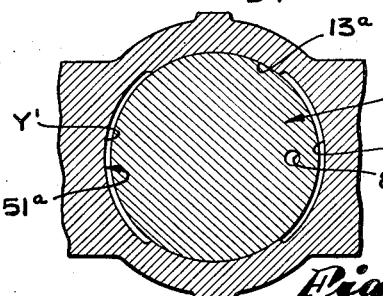

The various objects and features of my invention will be fully understood from the following detailed description of typical preferred forms and applications of the invention, throughout which description reference is made to the accompanying drawings, in which:

Fig. 1 is a vertical sectional view showing the principal or working parts of the structure that I have provided. Fig. 2 is a transverse sectional view being a view taken as indicated by line 2—2 on Fig. 1. Fig. 3 is an enlarged detailed sectional view of a portion of the structure shown in Fig. 2. Fig. 4 is an enlarged detailed sectional view of a portion of the structure shown in Fig. 1. Fig. 5 is a plan section taken as indicated by line 5—5 on Fig. 1. Fig. 6 is a view similar to Fig. 1, showing another form of construction. Fig. 7 is a plan section taken as indicated by line 7—7 on Fig. 6. Fig. 8 is a view similar to Fig. 7 showing the parts in a different rotative position. Fig. 9 is a plan section taken as indicated by line 9—9 on Fig. 6, and Fig. 10 is a plan section taken as indicated by line 10—10 on Fig. 6.

The construction that I have provided is applicable, generally, to plug valves and in the drawings I have shown it as applied to tapered plug valves, which type of valve is one commonly used. Referring to the form of the invention illustrated in Figs. 1 to 5, inclusive, the valve includes, generally, a body A, a plug B, a stem C projecting from the plug through a cap D on the body, operating means E provided for rotating the plug, and operating means F provided for shifting the plug axially.

The body of the valve includes an enlarged central portion 10 and projecting end portions 11 that extend from opposite sides of the enlarged portion 10. In accordance with common valve construction a fluid passage 12 extends through the body from the outer end of one end part 11 to the outer end of the other end part 11 and a plug opening 13 enters the enlarged portion 10, preferably from its upper end to intersect the passage 12. In the particular valve illustrated the passage 12 is a round passage uniform in size throughout its length and the end parts 11 are provided with connecting flanges 14.

The plug opening 13 provided in the body is a tapered opening extending downwardly in the enlarged body portion 10 well past the passage 12 or to the lower end portion of the body which is closed by a bottom wall 15. The upper end of the opening 13 provided in the body is closed by the cap D which has a part 16 that extends downwardly into a counterbore 17 provided at the upper or large end of opening 13. The cap D has a flange 18 overlying the upper end of body 10 and suitable fastening devices or screw members 19 releasably connect the cap to the body. In accordance with the preferred form of the invention a packing member 20 is provided between the cap and the counterbore 17 to check escape of fluid between the cap and the body.

The plug B is a simple, tapered plug tapered to correspond to the opening 13 so that it fits in the opening in the manner illustrated throughout the drawings. A hole 21 is provided transversely through the plug which hole is preferably the same size and shape as passage 12 and is so located that it can be moved into and out of register with the passage 12 by suitable rotation of the plug in the body. In accordance with my present invention the upper or large end 22 of the plug B terminates below the lower end 23 of the projecting portion 16 of the cap D so that a chamber 24 is established or provided between the cap and the plug. The chamber 24 is provided to carry a supply of sealing material and may be referred to as a pressure chamber.

The stem C is preferably an integral extension of the plug B and extends upwardly through an opening 25 in the cap D to project above the cap where it carries the means E and F. The portion 16 of cap D is counterbored at 26 to carry packing 27 that serves to seal against escape of fluid upwardly around the stem.

The means E provided for rotating the plug may be a head 30 held on a polygonal portion 31 of the stem by a suitable nut 32. The head is provided with openings 33 to receive bars or other tools whereby the plug may be rotated.

The means F is provided for shifting the plug axially and in the form of the invention illustrated it is in the form of a nut 40 carried on the stem C between a downwardly facing part 41 of the head 30 and an upwardly facing shoulder 42 on the stem. The nut is threaded into the cap D at 44 so that when the nut is rotated as by engaging a suitable bar or tool in one of the openings 45 the plug is moved up or down depending upon the direction of rotation of the nut.

The sealing construction that I have provided involves, generally, means 50 by which sealing material is introduced into the chamber 24, channels 51 in the plug structure carrying bodies of sealing material to surround the ends of passage 12 intersecting plug opening 13 when the plug is positioned so that its hole 21 is transverse of passage 12, and individual means 54 by which sealing material is supplied from the chamber 24 to the channels 51.

The means 50 is preferably a single fitting provided on the exterior of the body A to facilitate introduction of sealing material to the chamber 24 through a suitable port 60. In the particular case illustrated the fitting 50 has an inner end portion 61 threaded into the enlarged outer end portion of port 60 and it has an enlarged outer end portion 62 provided with a chamber 62ª in which a check valve 63 is mounted. A suitable grease fitting 66 is provided in connection with the enlarged portion 62 of the fitting. With the structure just described a suitable grease gun such as is ordinarily employed for applying lubricant may be applied to the grease fitting 66 to introduce lubricant or sealing material past valve 63 so it passes through port 60 into pressure chamber 24.

In the form of the invention illustrated in Figs. 1 to 5, inclusive, the channels 51 are located or formed in the plug D and since the hole 21 through the plug opens at diametrically opposite sides of the plug, the two channels are located at diametrically opposite sides of the plug and each surrounds the hole where it intersects the exterior of the plug. Each channel extends continuously around the hole and in the particular case illustrated it involves longitudinal portions X having their ends joined by circumferential portions Y. In the drawings I have shown the channel portions as rounded or cup-shaped in cross section. However, it is to be understood that in practice they can be of any desired configuration and they may be varied widely in location and size, as circumstances may require.

The means 54 that I have provided serves to individually connect the two channels 51 with the common pressure chamber 24. In accordance with the preferred form of my invention there is a connecting port 70 for each channel 51. Each connecting port 70 extends downwardly in the plug from its upper end and then laterally to a point where it connects with one of the circumferential portions Y of the channel to which it connects. A check valve is provided in connection with each port 70 and serves to freely pass fluid from the pressure chamber 24 to the port 70 that positively prevents return flow from port 70 to chamber 24 so there can be no communication of pressure from one channel 51 to the other. In the case illustrated each check valve involves a simple fitting 72 threaded into the end of port 70 at the upper end of the plug and a ball valve 73 is carried by the fitting to cooperate with a seat in the fitting to gain the desired valve action.

In practice I may use any desired sealing material in the structure I have provided. For example, for many classes of service I may use a heavy grease or the like. In any event the material to be employed as the sealing material or sealing medium is introduced through the single fitting 50 to fill the pressure chamber 24. From the pressure chamber 24 the sealing material passes through the individual check valves of the means 54 and is fed by the ports 70 into the channels 51 so that it fills the channels 51. The channels 51 filled with sealing material establish a continuous seal around points where the passage 12 intersects the plug opening 13 when the plug is closed, as shown in Fig. 1, so that the hole through the plug is transverse of the passage 12. By providing channels 51 at opposite sides of the plug and by providing the two means 54, one for each channel, I provide two seals and thus effectively prevent leakage when the plug is in the closed position. It is to be noted that the packings 20 and 27 sealing the cap in the body and the stem in the cap are so located that the sealing material under pressure in chamber 24 acts on them to maintain them tightly engaged or sealed.

In accordance with the preferred form of my invention I provide stop means between the body and plug to limit rotation of the plug in the body. In the drawings I have shown a stop pin 75 carried by the bottom 15 of body part 10 to project upwardly into a channel 76 provided in the lower or small end of the plug. The stop pin 75 cooperates with the ends of the channel 76 in stopping the plug and the parts are preferably arranged and related so that the plug is stopped in position where its hole 21 is transverse of passage 12 and is also stopped in a position where its hole 21 is in alignment with the passage 12. It will be understood that the plug is freely rotatable between the stopped positions and it will be apparent how it can be freed for rotation by moving it axially through operation of means F, if necessary. Furthermore, it will be apparent that the plug may be seated tightly in the opening 13 by operation of means F if necessary.

In the preferred form of my invention the lower end 80 of the plug is spaced somewhat from the bottom 15 of the body leaving a chamber 81 at the lower end of the plug that is maintained in communication with the pressure chamber 24 by one or more ports 82 extending longitudinally through the plug between its ends. Through this construction material supplied to the pressure chamber through the means 50 is conducted by port 82 to the chamber 81 with the result that a body of sealing material is maintained in the chamber 81.

In the form of the invention illustrated in Figs. 6 to 10, inclusive, the channels 51ª instead of being formed in the plug, as above described, are formed in the wall of the plug opening 13ª and the ports 70ª of means 54ª instead of conducting sealing material to channels in the plug conduct such material to the channels 51ª in the body or in the wall of opening 13ª. The channels 51ª have longitudinally or axially disposed portions X' with their ends joined by circumferential portions Y', the portions X' and Y' forming continuous openings or channels around the points where the passage 12 communicates with opening 13ª. The ports 70ª communicate with the uppermost circumferential portions Y' and the said uppermost portions Y' are of sufficient circumferential extent so that the ports 70ª are in communication with the said upper portion Y' of the channels at all times, that is, when the valve is open and also when the valve is closed. This relationship of parts is clearly illustrated in Figs. 7 and 8 of the drawings.

In this form of the invention, as in the form first described, I provide a stop pin 75 operating in a channel 76 in the lower end of the plug to limit rotation of the plug, and I provide a port 82 in the plug extending from one end to the other so sealing material is conducted from the pressure chamber 24 at the upper end of the plug to the chamber 81 at the lower end of the plug. It is to be understood that the means 54ª that I have shown in Figs. 6 to 10 includes fittings 72 carrying check valves the same as the fittings shown in Fig. 4 of the drawings, so that the channels 51ª are separated by the valves so that pressure is not communicated between the channels, although both channels are supplied or fed with sealing material from the common pressure chamber 24 supplied through a single means 50 accessible from the exterior of the structure.

Having described only typical preferred forms and application of my invention, I do not wish to be limited or restricted to the specific details herein set forth, but wish to reserve to myself any variations or modifications that may appear to those skilled in the art and fall within the scope of the following claims.

Having described my invention, I claim:

1. A plug valve including, two elements, one a body having an elongate portion with a flow passage extending longitudinally therethrough and having a lateral projection on said portion, there being an opening through said projection and intersecting the passage, the other element being a plug in the said opening and rotatably engaged with the portion of the first mentioned element where the said passage and said opening intersect, the plug having a transverse hole through it adapted to be moved into and out of register with the passage by rotation of the plug relative to the body and having a stem projecting through the said opening to the exterior of the body, a unitary cap on said lateral projection and surrounding the stem, the cap having an upper portion with an aperture passing the stem, the stem being rotatably engaged in the portion of the cap defining the said aperture therein, the cap having a lower portion with an annular chamber surrounding the stem and in communication at the bottom of the cap with the said opening, fluid pressure actuated sealing means supported by the cap in the said annular chamber and having sealing engagement with the stem and cap and adapted to be operated by fluid entering said chamber from the said opening, there being channels in one of said elements located between said elements and around the passage where the passage and opening in the body intersect when the said hole is out of register with the passage and adapted to carry sealing material to engage and seal between the body and plug, the channels being in communication with the annular chamber, and a supply means connected with the chamber and adapted to supply sealing fluid thereto.

2. A plug valve including, a body having an elongate portion with a flow passage extending longitudinally therethrough and having a lateral projection, there being an opening extending through the projection and intersecting the passage, a plug in the said opening and rotatably engaged with the body and having a hole therethrough adapted to be moved into and out of register with the passage by rotation of the plug relative to the body, a stem concentric with and projecting from the upper end of the plug, a unitary cap mounted on the projection of the body at the outermost end of the said opening, the cap having an upper portion rotatably carrying the stem and having a lower portion extending into the said opening and defining a downwardly opening annular chamber around the stem and a downwardly opening annular chamber between the cap and body, sealing means in the last mentioned chamber engaging the cap and the body and adapted to be operated by fluid from the said opening to seal between the cap and body, sealing means in the first mentioned chamber engaging the stem and cap and adapted to be operated by fluid from the said opening, there being channels between the plug and body where the plug and body are engaged and extending around the flow passage in the body when the hole in the plug is out of register with the passage in the body, the said channels being adapted to carry sealing material to engage and seal with the plug and body, the channels being in communication with said opening, and supply means connected with the said opening and adapted to supply sealing material thereto for passage therefrom to the channels.

LELAND S. HAMER.

References Cited in the file of this patent

UNITED STATES PATENTS

| Number | Name | Date |
| --- | --- | --- |
| 2,011,113 | Neuhaus | Aug. 13, 1935 |
| 2,026,891 | Haun | Jan. 7, 1936 |
| 2,039,523 | Dopp | May 5, 1936 |
| 2,041,669 | Whittle | May 19, 1936 |
| 2,066,250 | Clark | Dec. 29, 1936 |
| 2,229,932 | Parker | Jan. 28, 1941 |
| 2,307,443 | Atkinson et al. | Jan. 5, 1943 |
| 2,319,943 | Nordstrom | May 25, 1943 |
| 2,322,379 | Moorehead | June 22, 1943 |
| 2,360,599 | Volpin | Oct. 17, 1944 |
| 2,421,879 | Hamer | June 10, 1947 |